US006584849B2

United States Patent
Loftus et al.

(10) Patent No.: US 6,584,849 B2
(45) Date of Patent: Jul. 1, 2003

(54) ANALYZING VIBRATION OF ROTATING BLADES

(75) Inventors: Peter Loftus, Derby (GB); Colin J Parrish, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 10/107,154

(22) Filed: Mar. 28, 2002

(65) Prior Publication Data

US 2002/0162394 A1 Nov. 7, 2002

(30) Foreign Application Priority Data

Apr. 17, 2001 (GB) .............................. 0109324

(51) Int. Cl.⁷ .................. G01M 13/00; G01M 1/22; G01H 11/00
(52) U.S. Cl. .................................. 73/659; 73/660
(58) Field of Search .................. 73/659, 660, 661, 73/763, 768, 774, 775, 593

(56) References Cited

U.S. PATENT DOCUMENTS

| 4,573,358 A | * | 3/1986 | Luongo ............... 73/660 |
| 4,887,468 A | * | 12/1989 | McKendree et al. ...... 73/660 |
| 4,896,537 A | * | 1/1990 | Osborne ................ 73/660 |
| 4,914,953 A | * | 4/1990 | Viscovich ............. 73/660 |
| 4,955,269 A | * | 9/1990 | Kendig et al. ......... 73/577 |
| 5,097,711 A | * | 3/1992 | Rozelle et al. ........ 73/660 |
| 5,206,816 A | * | 4/1993 | Hill et al. ........... 702/56 |
| 5,479,826 A | * | 1/1996 | Twerdochlib et al. .... 73/660 |
| 6,094,989 A | * | 8/2000 | Twerdochlib .......... 73/659 |

FOREIGN PATENT DOCUMENTS

JP          01274019 A  * 11/1989  .......... G01H/17/00

* cited by examiner

*Primary Examiner*—Helen Kwok
*Assistant Examiner*—Rose M. Miller
(74) *Attorney, Agent, or Firm*—W. Warren Taltavull; Manelli Denison & Selter PLLC

(57) ABSTRACT

A method of characterizing the vibration of a plurality of rotating blades (12), such as turbine blades in a gas turbine engine, includes the steps of providing a single strain gauge (16A) on a single one (12A) of the blades and providing either one or two tip timing probes (22A, 22B) on a casing surrounding the blades. The data from the strain gauge (16A) allows the vibration of the single blade (12A) to be fully characterized while the data from the tip timing probes (22A, 22B) allows the amplitudes or velocities of vibration of all the blades to be determined. The relationship between the data from the tip timing probes for the single blade (12A) and the stress data from the strain gauge may be established. This relationship may then be assumed to apply to all the blades, thus allowing the stresses induced in all the blades by the vibrations to be determined.

13 Claims, 2 Drawing Sheets

ANALYZING VIBRATION OF ROTATING BLADES

The invention relates to a method and apparatus for providing information about the vibration of rotating blades, particularly those in gas turbine engines.

In the development of gas turbine engines, it is necessary to measure the vibration (both amplitude and frequency) of the rotating blades. From such measurements, the induced stresses in the blades may be determined and action taken to avoid stresses which are high enough to cause damage to the blades.

It is known to mount strain gauges on rotating turbine blades to provide information about the amplitudes and frequencies of vibration of the blades. One strain gauge is provided on each blade, and connected to a radio telemetry system mounted on the rotor, which transmits the measurements from the rotor. Due to the number of strain gauges required to fully determine the vibration, the telemetry system is complex, large and time consuming to install within the rotor.

An alternative technique for characterising blade rotation is "tip timing" in which a non-contact probe mounted on the turbine casing is used to measure the time at which a blade passes. This time is compared with the time at which the blade would have passed the probe if it had been undergoing no vibration. This is termed the "expected arrival time" and can be calculated from the rotational position of the particular blade on the rotor in conjunction with a "once per revolution" or "OPR" signal which provides information about the position of the rotor. The OPR signal is derived from the time at which an indicator on the rotor passes a reference sensor, and its use is well known in the art.

The difference between the expected arrival time and the actual arrival time can be multiplied by the turbine blade tip velocity to give the displacement of the blade from its expected position. Data from a plurality of sensors can be processed to obtain the amplitudes and frequencies of vibration of the blades.

The above tip timing method does not require a telemetry system since the probes are mounted on the casing. However, a large number of probes are required to characterise the vibration of all the blades and their installation is thus complex and time consuming.

According to the invention, there is provided a method of characterising the vibration of a plurality of rotating blades mounted on a rotor, the method including the steps of:
 providing a strain gauge on one of the blades;
 analysing data from the strain gauge to provide information about the frequencies of vibration and the vibrationally induced stresses in that blade;
 providing at least one timing probe for detecting the times at which respective blades pass the probe;
 analysing data from the or each timing probe to obtain information about the amplitudes and/or velocities of vibration of each of the plurality of blades;
 determining the relationship between vibrationally induced stress as measured by the strain gauge and vibrational amplitude or velocity as measured by the timing probe(s) for the blade on which the strain gauge is mounted, for a particular frequency of vibration; and
 assuming that the above relationship is applicable to each of the plurality of blades, calculating the vibrationally induced stress for each blade from its amplitude or velocity of vibration as measured by the timing probe(s) and the said relationship.

Preferably the said relationship is a ratio of vibrationally induced stress as measured by the strain gauge to vibrational amplitude or velocity as measured by the timing probe(s).

Preferably the method further includes the step of providing reference indicia on the rotor and a reference probe for providing a signal when the reference indicia passes the probe, thereby providing a signal once for every rotation of the rotor (an "OPR" signal).

Preferably the timing probe(s) and the reference probe are mounted on a casing surrounding the blades.

Preferably the method includes the step of determining, for each of the plurality of blades, its spatial relationship with the reference indicia on the rotor. Preferably the method includes the step of calculating an expected arrival time at which each blade tip would pass a respective timing probe were it undergoing no vibration.

Preferably the strain gauge data is analysed by Fourier analysis. The analysis for a particular frequency may include determining the amplitude of vibration of the blade and, from that information, the stresses induced in the blade by that mode of vibration.

In relation to timing probe data, if the vibration of the blades is asynchronous, the amplitude of vibration may be measured by: measuring the displacement of the blade from its expected position for each of a plurality of rotations of the blade; determining the maximum displacement of the blade from its expected position; and assuming that this maximum displacement is the vibrational amplitude. Preferably the displacement of the blade is measured for at least twelve rotations of the rotor.

Alternatively, the timing probe data may be analysed using Fourier analysis on a plurality of timing probe measurements, the excited mode or modes of vibration being indicated by peaks in the spectrum.

If the vibration of the blades is synchronous, the method may include the steps of:
 determining an approximate resonance frequency for a blade;
 rotating the blade at a plurality of frequencies in a range from below to above the approximate resonance frequency, and at each frequency measuring the displacement of the blade from its expected position, using a timing probe;
 analysing the plurality of measured displacements at the respective plurality of frequencies to provide maximum and minimum displacement values; and
 comparing the maximum and minimum displacement values to provide an indication of the amplitude of the vibration of the blade.

Preferably the method includes the use of two spaced timing probes. The probes are preferably spaced between 5° and 20°, and typically about 10°, apart. The velocity of a blade may be measured by determining the time of flight of the blade tip between the two probes and using this time and the known physical separation of the probes to calculate a blade tip velocity. The velocity due to the steady rotation of the blades may then be subtracted to indicate the vibrational velocity.

According to the invention there is further provided apparatus for characterising the vibration of rotating blades, the apparatus including:
 a plurality of blades mounted for rotation on a rotor and extending radially outwardly therefrom;
 a casing at least partially surrounding the blades;
 a strain gauge mounted on one of the blades;
 and at least one timing probe mounted on the casing.

Preferably the apparatus further includes:

means for analysing data from the strain gauge to provide information about the frequencies of vibration of the blade and the vibrationally induced stresses in that blade;

means for analysing data from the or each timing probe to obtain information about the amplitudes and/or velocities of vibration of each of the plurality of blades; and means for determining the relationship between vibrationally induced stress as measured by the strain gauge and vibrational amplitude or velocity as measured by the timing probe(s) for the blade on which the strain gauge is mounted, for a particular frequency of vibration; and assuming that the above relationship is applicable to each of the plurality of blades, calculating the vibrationally induced stress for each blade from its amplitude or velocity of vibration as measured by the timing probe(s) and the said relationship.

The apparatus preferably further includes a reference probe mounted on the casing and a reference indicia on the rotor, and means for providing a signal when the reference indicia passes the reference probe.

An embodiment of the invention will be described for the purpose of illustration only with reference to the accompanying drawings in which.

Figure 1:
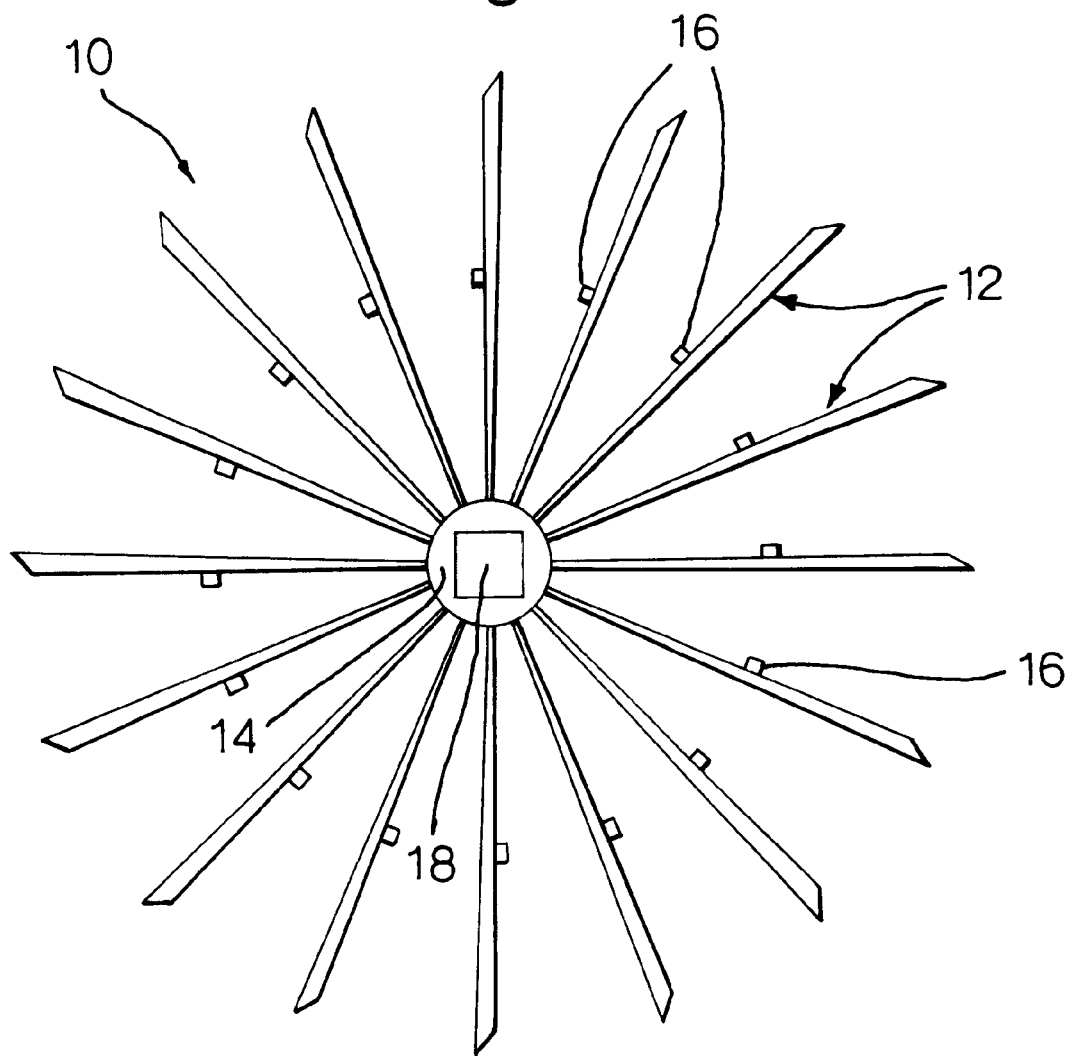
FIG. 1 is a highly schematic cross-section through an arrangement of rotating blades provided with a prior art system for characterising the blades' vibration.

Referring to FIG. 1, there is illustrated a blading arrangement 10 comprising a plurality of blades 12 mounted for rotation on a rotor 14. The blades 12 would typically be compressor blades of a gas turbine engine, but could be unshrouded turbine blades or turbine blades with loose outer shrouds.

In the development of gas turbine engines, it is necessary to measure the vibration of the rotating blades and to determine the induced stresses in the blades as they vibrate. In this way, action may be taken to avoid stresses which are high enough to cause damage to the blades.

One prior art method of characterising the rotation of blades is illustrated in FIG. 1. A strain gauge 16 is mounted on each blade 12. Each strain gauge 16 is able to fully characterise the vibration of the blade on which it is mounted, by providing the amplitudes and frequencies of vibration together with information as to the induced stresses in the blade.

The strain gauges 16 are connected to a radio telemetry system 18 mounted on the rotor 14. This telemetry system transmits readings from the strain gauges 16 for subsequent analysis. Because a strain gauge 16 is provided on each blade 12 within the blade arrangement 10, a large number of strain gauges are required and the telemetry system 18 is complex, large and time consuming to install within the rotor 14.

An alternative technique for characterising blade vibration is "tip timing" in which a number of non-contact probes are used to measure the times at which the blades pass various stationary points as they rotate about the engine axis. This technique does not require a telemetry system since the probes can be mounted on the casing within which the blades rotate. However, according to the prior art this technique requires the use of a large number of probes and is thus also complex and time consuming to install.

Figure 2:
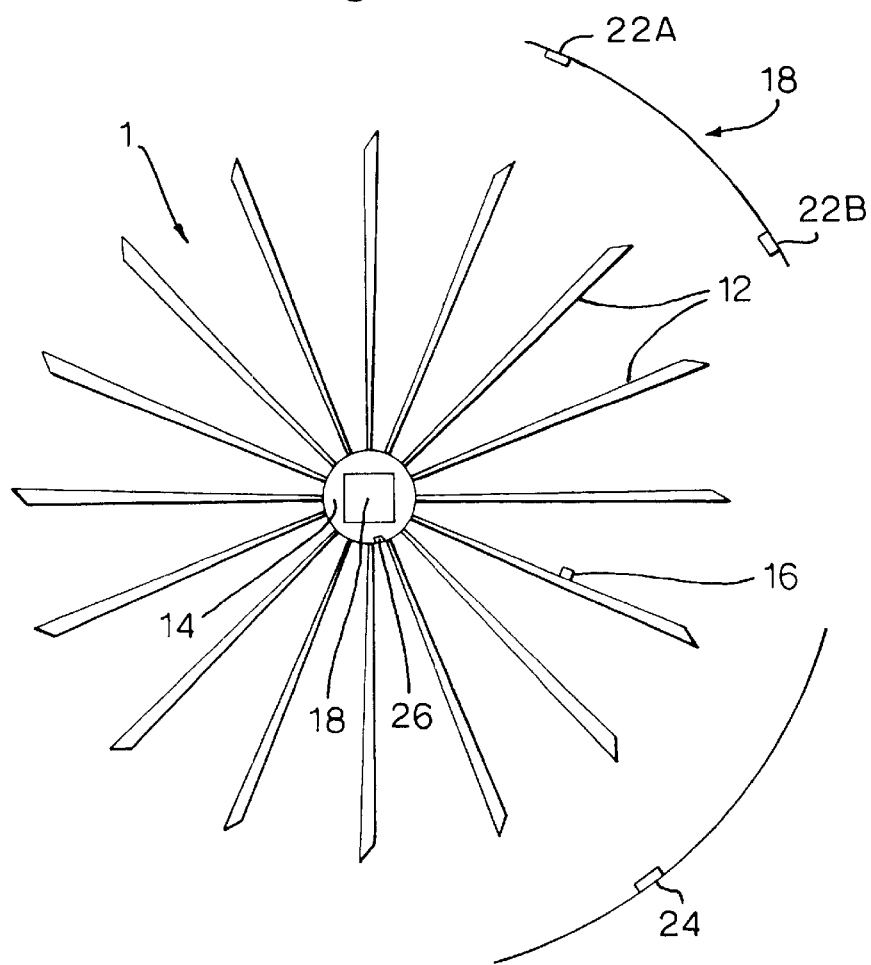
FIG. 2 is a highly schematic cross-section through a similar arrangement of rotating blades provided with a system according to the invention, for characterising the blades' vibration.

Referring to FIG. 2, there is illustrated an arrangement according to the invention. FIG. 2 again shows a blade arrangement 10 comprising a plurality of blades 12 mounted for rotation on a rotor 14. The blades extend radially outwardly from the rotor 14, and rotate within a casing 18 (only parts of which are illustrated). A single one only of the blades 12A is provided with a strain gauge 16A which is connected to a basic telemetry system 18 mounted on the rotor 14. Because the telemetry system has to deal only with readings from a single strain gauge 16A, it is relatively small and straightforward to fit. The readings from the strain gauge 16A enable the vibration of the particular blade 12A to be fully characterised, providing amplitude information, frequency information and an indication of the induced stresses in the blade. The strain gauge information may be analysed using known techniques, such a Fourier analysis.

Mounted on the casing 20 which surrounds the rotating blades is a reference probe 24. The reference probe 24 is able to measure the time at which an indicator 26 mounted at a known circumferential position on the rotor 14 passes, to provide a "once per revolution" or "OPR" signal. This signal enables the rotational position of the rotor to be determined at any time.

Also mounted on the casing 20 are two tip timing probes 22A and 22B. The tip timing probes 22A and 22B are able to provide information about the amplitudes and velocities of vibration of the rotating blades, by recording the times at which the blade tips pass the probes. The time at which a particular blade passes a tip timing probe may be compared with the time at which the blade in question would have passed the probe if it were undergoing no vibration. This is termed the "expected arrival time" and can be calculated from the rotational position of the particular blade on the rotor in conjunction with the OPR signal, and the known spatial relationship between the reference (OPR) sensor 24 and the tip timing probe taking the measurement. By using one or two tip timing probes, it is possible to obtain information about the amplitudes and velocities of vibration of all the blades. However it is not possible using two tip timing probes alone to also determine the associated frequencies of vibration and the induced stresses in the blades.

The invention involves the combining and comparing of tip timing data for the blade 12A with data obtained from the single strain gauge 16A mounted on the blade 12A. In this way a relationship may be established between the amplitudes/velocities of vibration determined from the tip timing data and the stresses induced in the blade as measured by the strain gauge. This relationship may be used to determine the approximate induced stresses in all blades, in a manner which is described in more detail hereinafter.

Before any comparison may take place, the tip timing data must be analysed to provide the amplitude/velocity information for each blade.

There are two different fundamental types of blade vibration: synchronous and asynchronous. Synchronous vibration occurs at frequencies which coincide with integer multiples (harmonics) of the assembly rotation frequency (the frequency of rotation of the rotor 14 on which the blades 12 are mounted). Synchronous vibration can be characterised by its amplitude and its frequency, with the frequency always being equal to the assembly rotation frequency multiplied by an integer known as the order of the response. Synchronous vibration may be caused by, for example, response to fixed struts such as guide vanes disturbing the airflow upstream of the blade assembly.

Figure 3:
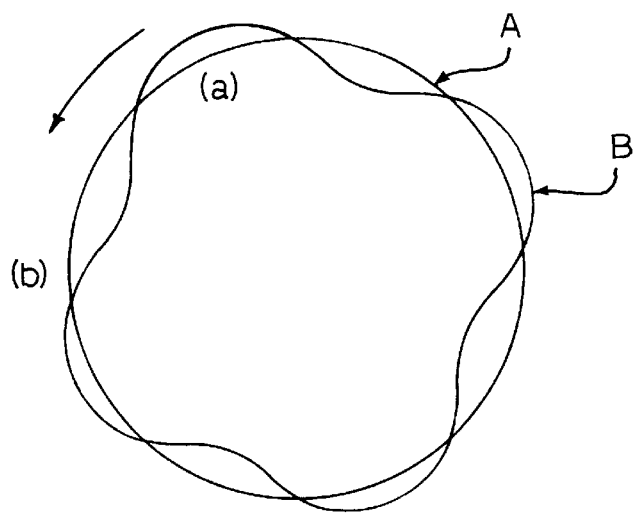
FIG. 3 is a schematic representation in the stationary reference frame of a synchronous vibration of a single blade as it rotates.

FIG. 3 is a schematic representation in the stationary reference frame of synchronous vibration of a blade as it rotates. The path labelled A represents a blade tip undergoing no vibration and the path labelled B a blade tip undergoing synchronous vibration of order 4. It may be seen that there are always a whole number of tip vibration wavelengths around the circle described by the blade. At any particular fixed point on the circle described by the blade, the blade tip is always at the same location on its sine wave. For example, at point (a) in FIG. 2, the blade tip will always be at its maximum amplitude of vibration, while at point (b) it will always be much nearer its mid point. Therefore, for a particular assembly excitation frequency the observed blade tip response at point (a) or point (b) does not depend on the time at which it is recorded. This means that the displacement measured by tip timing probe 22A or 22B is constant on successive rotations at a fixed assembly rotation rate.

Because the instantaneous displacement of a blade form its expected position (the "blade tip response amplitude") measured at any particular point is constant, the maximum amplitude of a resonance cannot be determined from measurements taken by a single tip timing probe at a single rotational frequency of the blade.

The blade tip response amplitude X, may be defined as follows:

$$X = (A(\omega)) \sin(\omega t + \phi(\omega))$$

where $A(\omega)$ is the response amplitude function (i.e. the maximum amplitude of blade vibration at frequency of blade rotation $\omega$) and $$A(\omega) = \frac{K}{(\omega_0^2 - \omega^2)^2 + \frac{(\omega \omega_0^2)^2}{Q}}$$

and $\phi(\omega)$ is the response phase $$\phi(\omega) = \tan^{-1} \frac{-\omega_o}{Q(\omega_c^2 - \omega^2)}$$

where K is the response amplitude scaling factor
$\omega_0$ is the single degree of freedom undamped resonance frequency (SDOF) (radians/s):
$\omega$ is the assembly excitation frequency (i.e. the frequency of rotation of the blades) (radians/s): and
Q is the SDOF resonance Q factor.

Thus, for any particular assembly excitation frequency, the blade tip vibration describes a sine wave with a maximum amplitude of $A(\omega)$. The blade tip vibration lags or leads the assembly excitation by an amount $\phi(\omega)$.

It can be seen that when the assembly excitation frequency $\omega$ is equal to the resonant frequency $\omega_0$, the maximum amplitude $A(\omega)$ is large (because the term $\omega_0^2 - \omega^2$ equals zero). In this situation, $\phi(\omega) = -90°$. Thus, at resonance the vibration of the blade is of high amplitude and lags the assembly excitation by 90°.

The product of the maximum vibrational amplitude and the cosine of the phase (i.e. the signal seen by a particular tip timing probe 22A or 22B) is such that it will sweep out a curve which has a peak to peak value equal to the peak value of the vibration, regardless of the arbitrary relative phase between the forcing excitation in the engine and the positioning of the probe on the casing. The amplitude of vibration may thus be determined by measuring the peak to peak amplitude seen after traversing the entire resonance. In this way the vibrational amplitude of the blade for a particular resonant frequency may be determined from the tip timing probe information.

The above analysis refers to a single degree of freedom model. This is only an approximation to the real case for a practical rotor assembly, and each blade is influenced by the vibrations of other blades and the disc. Additionally not all blades are identical, with every blade having a slightly different resonant frequency and damping, this being called mistuning. As a result of this, the resonances are more complex than the single degree of freedom model suggests, and different blades respond to the same excitation with different amplitudes. The equations illustrate the general properties of the blade vibration and the means of determining the amplitude, but the technique of the invention is not limited to the single degree of freedom case.

If more than one simultaneous resonance exists, then this would be difficult to resolve with a single probe. If two probes 22A and 22B are used, then cross-plotting may reveal the multiple resonances.

Plotting the displacement data from one tip timing probe on the X axis of a graph against the data from a second probe on the Y axis will produce a plot which is an approximate ellipse if the vibration is a single mode. If multiple modes are present then a separate ellipse is plotted for each mode, resulting in kinks or more than one loop in the plot as a second ellipse is plotted superimposed on the first ellipse.

A difficulty with amplitude information is that it can be distorted by hysteresis, occurring for example in the lean of the engine blade as the engine changes speed. Amplitude readings may also suffer from blade lean and untwist.

Instead of using amplitude measurements, blade tip velocity may be determined by measuring the time of flight of the blade tip between the probes 22A and 22B and using this time and the known physical separation of the probes on the casing to calculate a blade tip velocity. From this value is subtracted the velocity due to the steady rotation of the blades determined from the engine speed or measurements from the reference sensor 24. Velocity measurements suffer less from variations in the displacement measurement (for example due to blade lean and untwist hysteresis), but suffer more from instrument noise. However, instrument noise tends to be secondary in comparison to the other causes of errors.

Asynchronous vibrations are those occurring at frequencies which are not integer multiples of the assembly rotation frequency. Therefore, the blade tip response amplitude measured at a fixed location on the circumference of the rotating blade assembly 10 (for example as measured by a tip timing probe 22A or 22B) varies between successive rotations at a fixed assembly rotation rate. Asynchronous vibrations may be caused by blade flutter response, rotating stall and acoustic resonance. Such vibrations are referred to a "non-integral order" vibrations.

For asynchronous vibrations, peak amplitudes of vibration can be determined by measuring the vibrational amplitude on successive revolutions and determining the maximum amplitude recorded over a number of revolutions. Alternatively, it is possible to Fourier transform the data and measure the amplitudes in the excited mode from the size of the peaks in the spectrum. Only response components with a frequency less than half the rotation rate are defined uniquely. All other frequency components are present as aliases. Because the spectrum is heavily aliased, the frequency readings may be wrong and may need to be corrected using known techniques, but when there is a single mode excited this is unambiguous. When multiple modes are excited two or more peaks will appear in the frequency spectrum.

Again for asynchronous vibration the two tip timing probes 22A and 22B may be used the determine blade velocities instead of amplitudes.

It may thus be seen that the two tip timing probes 22A and 22B in conjunction with the OPR readings provided by the reference sensor 24 may be used to provide velocity or amplitude information for the vibration of each blade.

The strain gauge 16 provides complete information about the vibration of one blade 12A. Therefore, assuming initially that we are dealing with a single vibrational frequency, the strain gauge provides the amplitude of vibration, the frequency of vibration and the resultant stress in the blade. It has been found that the frequencies of vibration of all the blades on the rotor tend to be approximately the same, even though the amplitudes (and the induced stresses) may vary significantly. Thus it can be assumed that all blades have generally similar frequencies of vibration to the blade 12A.

The tip timing probes 22A and 22B provide information about the vibrational amplitudes or velocities for all blades, including the blade 12A. Therefore the vibrational amplitude or velocity of the blade 12A as measured by the tip timing probes may be compared with the stress induced in the blade by the vibration, as measured by the strain gauge. The ratio of stress (measured by the strain gauge) to vibrational amplitude or velocity (measured by the tip timing probes) may be calculated for the particular blade 12A.

It has been found by the Applicants that the above ratio tends to be approximately constant for all blades, even though their vibrational amplitudes may vary significantly. Thus, an approximate stress reading for each blade may be provided by multiplying its vibrational velocity as measured by the tip timing probes by the above mentioned ratio.

In summary, the method according to the invention involves the following steps:

1. Fit a single strain gauge to a nominal blade 12A with a minimal telemetry unit 18;
2. Fit two closely spaced tip timing probes 22A and 22B together with an OPR probe 24;
3. Acquire data from both systems for a vibration event;
4. Analyse strain gauge data to obtain frequency, amplitude and stress information for the event;
5. Analyse the tip timing data to acquire a vibrational amplitude or velocity for each blade;
6. Calculate stress/vibrational amplitude or velocity ratio for the blade 12A for the mode which is excited (known from strain gauge frequency);
7. Calculate stress for each blade using data from steps 5) & 6); and
8. Use the data from 7) to perform the usual stress analyses for the event (e.g. relate to peak stress in the blade, etc.).

In this way, the stresses induced in each blade may be estimated. This data may then be used to perform the known stress analyses for the particular vibrational event, for example relating the stresses to the peak stresses for the blade.

There is thus provided a method of characterising the vibration of a plurality of rotating blades which uses a single strain gauge and only one or two tip timing probes. This greatly simplifies the installation of the various instrumentation, reducing the times and the costs involved as compared to the conventional arrangement.

Various modifications may be made to the above described embodiment without departing from the scope of the invention. For example, the invention has been described with the use of two tip timing probes 22A and 22B in order that velocity measurements may be used. However, a single tip timing probe could be used and amplitude measurements used instead of velocities.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method of characterising the vibration of a plurality of rotating blades mounted on a rotor, the method including the steps of:

providing a strain gauge on one of the blades;

analysing data from the strain gauge to provide information about the frequencies of vibration and the vibrationally induced stresses in that blade;

providing at least one stationary timing probe for detecting the times at which respective blades pass the probe;

analysing data from the or each timing probe to obtain information about the amplitudes and/or velocities of vibration of each of the plurality of blades;

determining the relationship between vibrationally induced stress as measured by the strain gauge and vibrational amplitude or velocity as measured by the timing probe(s) for the blade on which the strain gauge is mounted, for a particular frequency of vibration; and assuming that the above relationship is applicable to each of the plurality of blades, calculating the vibrationally induced stress for each blade from its amplitude or velocity of vibration as measured by the timing probe(s) and the said relationship.

2. A method according to claim 1, wherein the said relationship is a ratio of vibrationally induced stress as measured by the strain gauge to vibrational amplitude or velocity as measured by the timing probe(s).

3. A method according to claim 1, the method further including the step of providing a reference indicia on the rotor and a reference probe for providing a signal when the reference indicia passes the probe, thereby providing a signal once for every rotation of the rotor.

4. A method according to claim 3, wherein the timing probe(s) and the reference probe are mounted on a casing surrounding the blades.

5. A method according to claim 3, wherein the method includes the step of determining, for each of the plurality of blades, its spatial relationship with the reference indicia on the rotor and calculating an expected arrival time at which each blade tip would pass a respective timing probe were it undergoing no vibration.

6. A method according to claim 1, wherein the strain gauge data is analysed by Fourier analysis.

7. A method according to claim 6, wherein analysis for a particular frequency includes determining the amplitude of vibration of the blade and, from that information, the stresses induced in the blade by that mode of vibration.

8. A method according to claim 1, the method including the step of measuring the amplitude of asynchronous vibration by: measuring the displacement of the blade from its expected position for each of a plurality of rotations of the blade; determining the maximum displacement of the blade from its expected position; and assuming that this maximum displacement is the vibrational amplitude.

9. A method according to claim 1, wherein the timing probe data is analysed using Fourier analysis on a plurality of timing probe measurements, the excited mode or modes of vibration being indicated by peaks in the spectrum.

10. A method according to claim 1, the method including the step of measuring synchronous vibration by:

determining an approximate resonance frequency for a blade;

rotating the blade at a plurality of frequencies in a range from below to above the approximate resonance frequency, and at each frequency measuring the displacement of the blade from its expected position, using a timing probe;

analysing the plurality of measured displacements at the respective plurality of frequencies to provide maximum and minimum displacement values; and comparing the maximum and minimum displacement values to provide an indication of the amplitude of the vibration of the blade.

11. A method according to claim 1, wherein the method includes the use of two spaced timing probes, spaced between 5° and 20° apart.

12. Apparatus for characterising the vibration of rotating blades, the apparatus including:

a plurality of blades mounted for rotation on a rotor and extending radially outwardly therefrom;

a casing at least partially surrounding the blades;

a strain gauge mounted on one of the blades;

at least one timing probe mounted on the casing for indicating the passage of each of the individual blades;

means for analysing data from the strain gauge to provide information about the frequencies of vibration of the blade and the vibrationally induced stresses in that blade;

means for analysing data from the at least one timing probe to obtain information about the amplitudes and/or velocities of vibration of each of the plurality of blades; and means for determining in the relationship between vibrationally induced stress as measured by the strain gauge and vibrational amplitude or velocity as measured by the at least one timing probe for the blade on which the strain gauge is mounted for a particular frequency of vibration;

and assuming that the above relationship is applicable to each of the plurality of blades, calculating the vibrationally induced stress for each blade from its amplitude or velocity of vibration as measured by the at least one timing probe and said relationship.

13. Apparatus according to claim 12, the apparatus further including a reference probe mounted on the casing and a reference indicia on the rotor, and means for providing signal when the reference indicia passes the reference probe.

* * * * *